Figures 1, 2:
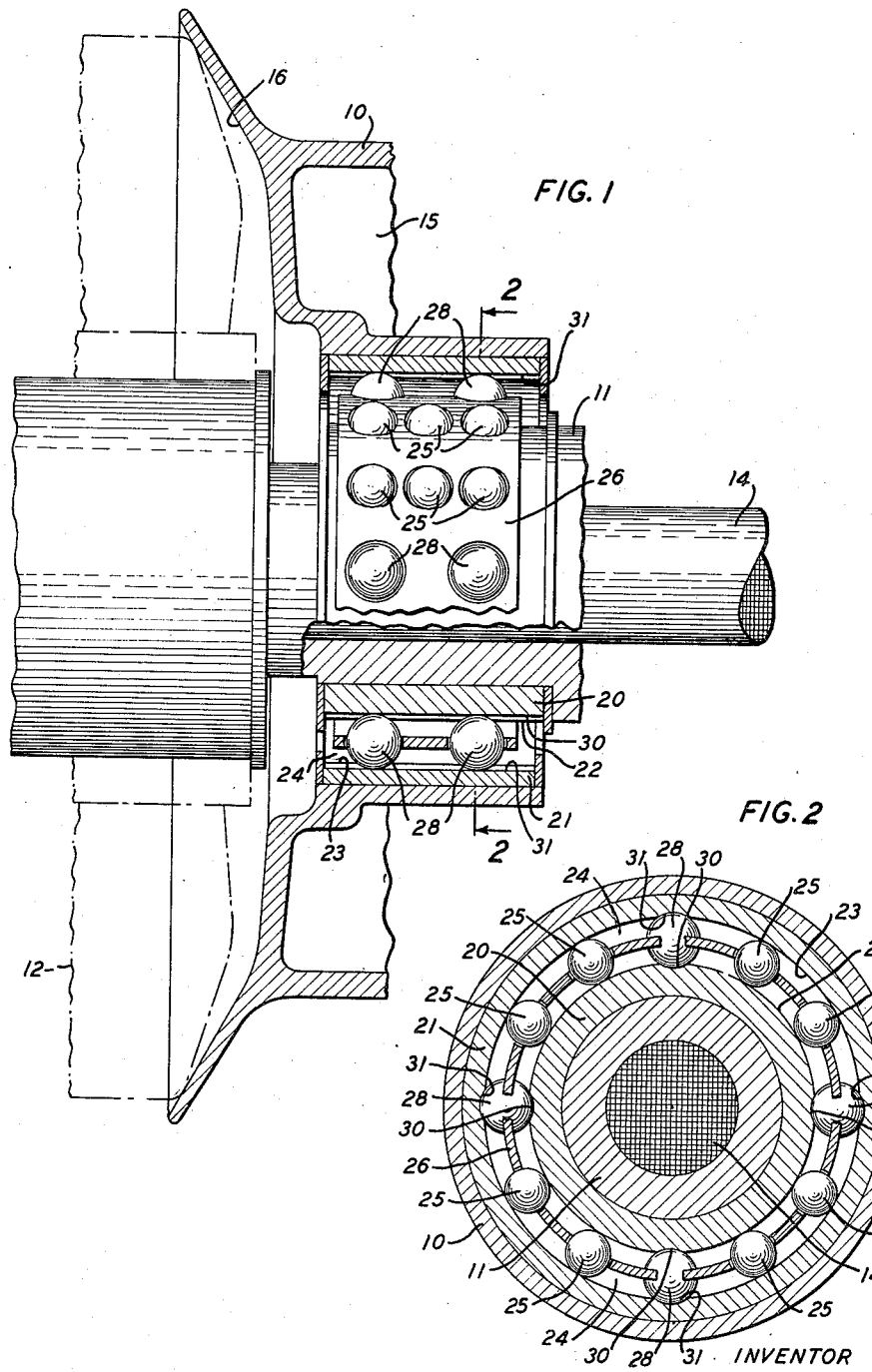

INVENTOR
H. H. MERWIN
BY
ATTORNEY

Patented July 31, 1951

2,562,729

UNITED STATES PATENT OFFICE 2,562,729

DRIVING MECHANISM

Harry H. Merwin, Rutherford, N. J., assignor to Western Electric Company, Incorporated, New York, N. Y., a corporation of New York Application September 11, 1946, Serial No. 696,126

1 Claim. (Cl. 64—23)

This invention relates to the driving mechanisms and more particularly to connecting structures interposed between driving shafts and elements driven thereby.

The key and keyway compose the most common connecting means between a drive shaft and an element driven thereby when it is desirable for the element to be movable axially of the shaft and positively driven thereby. This type of mechanical connection between the drive shaft and the element creates a frictional resistance working against the free axial movement of the element relative to the shaft, which resistance increases with the increase in speed of rotation of the shaft and element.

The object of the present invention is to provide a driving mechanism which is substantially frictionless for connecting a drive shaft to a driven element whereby the element may be moved freely relative to the shaft and maintained with its axis coincident with the axis of the shaft.

In accordance with the object, the invention comprises a driving mechanism in combination with a driving shaft and an element, to be driven thereby, disposed concentric with the shaft. The driving mechanism includes an inner annular member fixedly mounted upon the shaft and an outer annular member fixedly mounted in the driven element, these members having a series of ball members interposed between the annular members to support the outer annular member and the driven element for movement in a fixed path axially of the shaft. Other ball members are interposed between the annular members in aligned pairs of longitudinal grooves in the adjacent surfaces of the annular members to form a positive driving connection between the annular members and thus between the drive shaft and the driven element, leaving the outer annular member and the driven element free for axial movement relative to the shaft.

Other objects and advantages will be apparent from the following detailed description when considered in conjunction with the accompanying drawing, wherein Fig. 1 is a vertical sectional view of the driving mechanism; and Fig. 2 is a sectional view taken along the line 2—2 of Fig. 1.

The driving mechanism is a part of the material serving apparatus shown in the copending application of H. H. Merwin and G. C. Spillman, Serial No. 696,127, filed September 11, 1946, now Patent 2,430,358, granted November 4, 1947, wherein through the application of a constant force applying to a braking element, a variable force is applied to a cop of strand material as the cop diminishes in size through the paying off of the material during the winding of the material on a longitudinally advancing cable. In the present invention the braking element 10 is to be driven by a hollow drive shaft 11 in the same direction a cop 12 of strand material is driven, but at a speed slower than the minimum speed of the cop, the cop being driven by the pull of the strand while being served to the advancing cable 14. The cable is advanced longitudinally through the hollow shaft 11, the shaft rotatably supporting the cop. The braking element 10 is urged under the constant force of a fluid pressure created in a hollow portion 15 of the element to move the element axially of the shaft 11 toward the cop. The outer contour 16 of the element 10 is such that it will contact the cop 12 and apply a varied braking force to the cop translated from the constant force urging the element toward the cop. It will be understood that the employment of the conventional key and keyway connection between the element 10 and the drive shaft 11 would create a frictional drag which would increase in effect with an increase in the speed of rotation of the shaft to render the braking means inaccurate and possibly inoperative.

To maintain the element 10 positively connected to the shaft 11 to be driven thereby, yet free of a frictional drag for movement toward the cop axially of the shaft, substantially frictionless means is employed to bring about this result.

The driving mechanism includes an inner annular member 20 fixedly mounted concentric with the shaft and to be driven thereby. An outer annular member 21 is disposed within the element 10 and is fixed in place by suitable means (not shown). The inner or adjacent surfaces 22 and 23 of the members 20 and 21 are hardened and machined accurately to provide an annular space 24 with a cross-sectional dimension equal to the diameters of a series of like ball members 25 positioned therein. In the present embodiment, there are eight sets of the ball members, three in each set extending at spaced positions longitudinally of the shaft 11. A retaining member 26 apertured to receive the ball members maintains them in their respective positions between the surfaces 22 and 23. Pairs of larger ball members 28 are disposed at equally spaced positions and held against displacement by the retaining member 26 which includes apertures to receive the ball members 28. Concaved grooves or recesses 30 and 31 are formed in the outer periphery of the annular member 20 and the inner periphery of the annular member 21, to receive the ball members 28 and through the ball members form a positive driving connection between the shaft 11 and the element 10. The grooves or recesses 30 and 31 are parallel with each other and with the axis of the shaft 11.

During the operation of the mechanism, that is, during the driving of the shaft 11, the ball members 28 assure driving of the element 10 with the shaft, yet due to their connection between the shaft and the element, including the parallel grooves in which they are positioned, the element 10 is free to be moved axially of the shaft. The ball members 25 function not only as the main supporting means for the element, but as a means to maintain the element with its axis coincident with the axis of the shaft at all times irrespective of its position relative to the shaft. This is made possible due to the multiplicity of spaced supporting contacts, the ball members 25 provided not only circumferentially of the shaft, but at spaced positions longitudinally of the shaft, in the area of the element 10. The ball members 25 perform another function in coperation with the ball members 28 in maintaining the axes of the annular members 20 and 21 concentric with each other to eliminate any possible binding between the ball members 28 and their recesses 30 and 31 during the driving of the element with the shaft.

Although specific improvements of the invention have been shown and described, it will be understood that they are but illustrative and that various modifications may be made therein without departing from the scope and spirit of this invention as defined by the appended claim.

What is claimed is:

A driving mechanism interposed between a drive shaft rotated about its axis and an element to be driven thereby, the driving mechanism comprising an inner annular member fixedly mounted concentrically on the shaft and having an outer surface with longitudinally extending grooves therein parallel with the axis, an outer annular member fixedly mounted in the element concentric with its axis and having a smooth inner surface concentric with the smooth outer surface of the inner annular member and having longitudinally extending grooves therein parallel with the grooves in the inner annular member, supporting ball members of like diameters interposed between the smooth surfaces of the inner and outer annular members and engaging the said smooth surfaces at spaced positions about the axis except in the grooves to support the outer annular member and the element and maintain their axis coincident with the axis of the drive shaft, connecting ball members of a diameter larger than the diameters of the supporting ball members and the distances between the smooth surfaces of the annular members disposed in the grooves to form a positive driving connection between the element and the shaft, and a single member for retaining all the balls in predetermined relationship.

HARRY H. MERWIN.

REFERENCES CITED

The following references are of record in the file of this patent:

UNITED STATES PATENTS

| Number | Name | Date |
| --- | --- | --- |
| 754,066 | Hoffmann | Mar. 8, 1904 |
| 1,208,252 | Westinghouse | Dec. 12, 1916 |
| 1,270,533 | Lombard | June 25, 1918 |
| 2,371,330 | Irstad | Mar. 13, 1945 |